United States Patent
Pennazza et al.

(10) Patent No.: US 12,140,073 B2
(45) Date of Patent: Nov. 12, 2024

(54) ACCESSORY TRANSMISSION FOR A POWERTRAIN GROUP OF A VEHICLE AND POWERTRAIN GROUP COMPRISING SUCH TRANSMISSION

(71) Applicant: DAYCO EUROPE S.R.L., Chieti (IT)

(72) Inventors: Mario Pennazza, Pescara (IT); Olivier Boehm, La Garenne Colombes (FR)

(73) Assignee: PROPULSION SOLUTIONS S.R.L., Ivrea (IT)

( * ) Notice: Subject to any disclaimer, the term of this patent is extended or adjusted under 35 U.S.C. 154(b) by 288 days.

(21) Appl. No.: 17/630,970

(22) PCT Filed: Jul. 30, 2020

(86) PCT No.: PCT/IB2020/057206
§ 371 (c)(1),
(2) Date: Jan. 28, 2022

(87) PCT Pub. No.: WO2021/019492
PCT Pub. Date: Feb. 4, 2021

(65) Prior Publication Data
US 2022/0268202 A1 Aug. 25, 2022

(30) Foreign Application Priority Data
Jul. 30, 2019 (IT) .......................... 102019000013350

(51) Int. Cl.
*F02B 67/06* (2006.01)
*B60K 6/36* (2007.10)
(Continued)

(52) U.S. Cl.
CPC ............... *F02B 67/06* (2013.01); *B60K 6/36* (2013.01); *B60K 6/40* (2013.01); *B60K 6/442* (2013.01);
(Continued)

(58) Field of Classification Search
CPC . B60K 6/36; B60K 6/40; B60K 6/442; B60K 25/02; F02B 67/06; F16H 7/02
See application file for complete search history.

(56) References Cited

U.S. PATENT DOCUMENTS 6,083,130 A * 7/2000 Mevissen .................. F16D 3/72
474/69
6,848,552 B2 * 2/2005 Miller .................. F02N 15/026
192/104 R
(Continued)

FOREIGN PATENT DOCUMENTS

CN 103477119 A 12/2013
WO 199850709 A1 11/1998

OTHER PUBLICATIONS

PCT/IB2020/057206, International Search Report and Written Opinion, Nov. 2, 2020 (13 pages).
(Continued)

*Primary Examiner* — John D Walters
(74) *Attorney, Agent, or Firm* — FisherBroyles, LLP; Susan M. Oiler

(57) ABSTRACT

Accessory transmission for an engine of a motor vehicle has a first pulley adapted to be connected to a crankshaft of the engine, a second pulley adapted to be connected to a shaft of an electric machine through a one-way clutch, and a belt connecting the first and the second pulley to one another in order to rotate in one and the same rotation direction (R). The one-way clutch is configured so as to couple the second pulley to the shaft of the electric machine when the electric machine drives the second pulley in the rotation direction, and to decouple the second pulley from the shaft of the electric machine when the second pulley tends to overrun the electric machine in the rotation direction.

4 Claims, 3 Drawing Sheets

(51) Int. Cl.
*B60K 6/40* (2007.10)
*B60K 6/442* (2007.10)
*B60K 25/02* (2006.01)
*F16H 7/02* (2006.01)

(52) U.S. Cl.
CPC .............. *B60K 25/02* (2013.01); *F16H 7/02* (2013.01); *B60K 2025/022* (2013.01); *B60Y 2200/92* (2013.01)

(56) References Cited

U.S. PATENT DOCUMENTS

| | | | |
|---|---|---|---|
| 9,169,904 B2* | 10/2015 | Graves ................... | B60K 25/02 |
| 2009/0291794 A1* | 11/2009 | Amanuma ............ | F16D 41/088 |
| | | | 474/171 |
| 2021/0122357 A1* | 4/2021 | Xu ........................ | B60W 10/06 |

OTHER PUBLICATIONS

English Translation of Chinese Office Action, CN Application 202090061679.9, Sep. 22, 2023, p. 1-14.

* cited by examiner

ACCESSORY TRANSMISSION FOR A POWERTRAIN GROUP OF A VEHICLE AND POWERTRAIN GROUP COMPRISING SUCH TRANSMISSION

CROSS-REFERENCE TO RELATED APPLICATIONS

This patent application is filed under 35 U.S.C. § 371 as the U.S. National Phase of International Patent Application No. PCT/IB2020/057206, filed Jul. 30, 2020, which designated the United States and which claims the benefit of Italian Patent Application No. 102019000013350, filed on Jul. 30, 2019, the entire disclosure of which is incorporated by reference.

TECHNICAL FIELD

The present invention relates to an accessory transmission for a powertrain group of a motor vehicle and to a powertrain group comprising such a transmission. The present invention is preferably, but not exclusively, implemented in a hybrid powertrain group to which reference will be made in the following without any consequent loss of generality.

BACKGROUND ART

As is known, vehicles with hybrid drive comprise an internal combustion engine and at least one electric machine that can be used as a generator or as a motor for providing motor torque in combination with (or as an alternative to) the internal combustion engine depending on the operating conditions of the vehicle.

A configuration in which an electric machine connected between the internal combustion engine and the transmission of the vehicle is used is conventionally called "P2". Modular units adapted to be placed between the internal combustion engine and the transmission of a vehicle (and hence normally referred to as "P2 modules"), which comprise, in addition to the electric machine, one or two clutches for selectively connecting the internal combustion engine and/or the electric machine as well as the corresponding actuators and transmission elements to the transmission, are known.

Powertrain groups for motor vehicles provided with an accessory transmission arranged on an end of the internal combustion engine that is opposite the transmission (normally indicated by "front end" or "P0") are also known. The accessory transmission, generally a belt transmission, connects one or more accessories to the crankshaft. Such accessories typically comprise an electric machine, which functions as an alternator and/or motor, and a compressor for the air-conditioning system, while the accessory transmission comprises corresponding pulleys connected to the crankshaft and to each of the accessories, a belt cooperating with the aforementioned pulleys and a tensioner adapted to ensure a minimum tension of the belt.

In cases where the electric machine is employed exclusively as an alternator (generator), it is known to place a one-way clutch or freewheel between the alternator and the corresponding pulley, with the aim of transmitting torque from the pulley to the electric machine when the latter is driven by the motor while allowing the electric machine to overrun the pulley in transitory operating conditions in which this can occur (for instance in the event of an abrupt deceleration of the crankshaft). This way, it is avoided that the high inertia of the electric machine subjects the belt to undesired spikes in tension.

In cases, however, which are increasing in frequency, where the electric machine is also employed as a motor, the use of a freewheel as described above is not possible as the electric machine must be able to receive or transmit torque to the corresponding pulley depending on the operating conditions.

In this case, to ensure a minimum tension of the belt in all operating conditions, a double tensioner is used which has a first tensioning pulley acting on the span of the belt upstream of the electric machine and a second tensioning pulley acting on the span of the belt downstream of the electric machine, since both spans can be the loose span depending on the operating conditions.

The known solutions described above can be combined with one another so as to form a hybrid powertrain group with an electric machine in position P0 (hereinafter: the P0 electric machine) and an electric machine in position P2 (hereinafter: the P2 electric machine); the two machines can be used with different control strategies (for instance as a motor only in one and in a reversible manner in the other).

Moreover, the start-up of the internal combustion engine can be effected by means of the P0 electric machine, the P2 electric machine or even by means of a third electric machine (a traditional starter motor) linked with the flywheel of the engine.

For example, in cases where the P0 electric machine is used as a motor only and the start-up of the internal combustion engine is effected by means of the P2 electric machine or the starter motor, the tension of the belt of the accessory transmission can reach unacceptable minimum values, as is visible in FIG. 4, which can cause noise and a premature deterioration of the belt.

DISCLOSURE OF INVENTION

The object of the present invention is the realization of an accessory transmission which resolves the aforementioned problem.

The aforementioned object is achieved by an accessory transmission for an engine of a motor vehicle has a first pulley adapted to be connected to a crankshaft of the engine, a second pulley adapted to be connected to a shaft of an electric machine through a one-way clutch, and a belt connecting the first and the second pulley to one another in order to rotate in one and the same rotation direction. The one-way clutch is configured to couple the second pulley to the shaft of the electric machine when the electric machine drives the second pulley in the rotation direction, and to decouple the second pulley from the shaft of the electric machine when the second pulley tends to overrun the electric machine in the rotation direction.

The present invention also relates to a powertrain group that has an internal combustion engine provided with a crankshaft having a first end facing a transmission of the vehicle and a second end, a hybrid module connected to the first end of the crankshaft, the hybrid module comprising a first electric machine and a clutch for selectively connecting the first electric machine to the crankshaft and to the transmission of the vehicle, a second electric machine provided with a shaft, a third electric machine which functions as a starter motor for the engine, and an accessory transmission as described in the preceding paragraph. The first pulley of the accessory transmission is connected to the second end of the driveshaft and the second pulley of the accessory transmission is selectively connectable to the shaft of the second electric machine by means of a one-way clutch that decouples the second pulley from the shaft of the second electric machine when the crankshaft is driven by the third electric machine.

BRIEF DESCRIPTION OF THE DRAWINGS

For a better understanding of the present invention, a non-limiting, preferred illustrative embodiment is described with reference to the attached drawings, wherein.

BEST MODE FOR CARRYING OUT THE INVENTION

Figure 1:
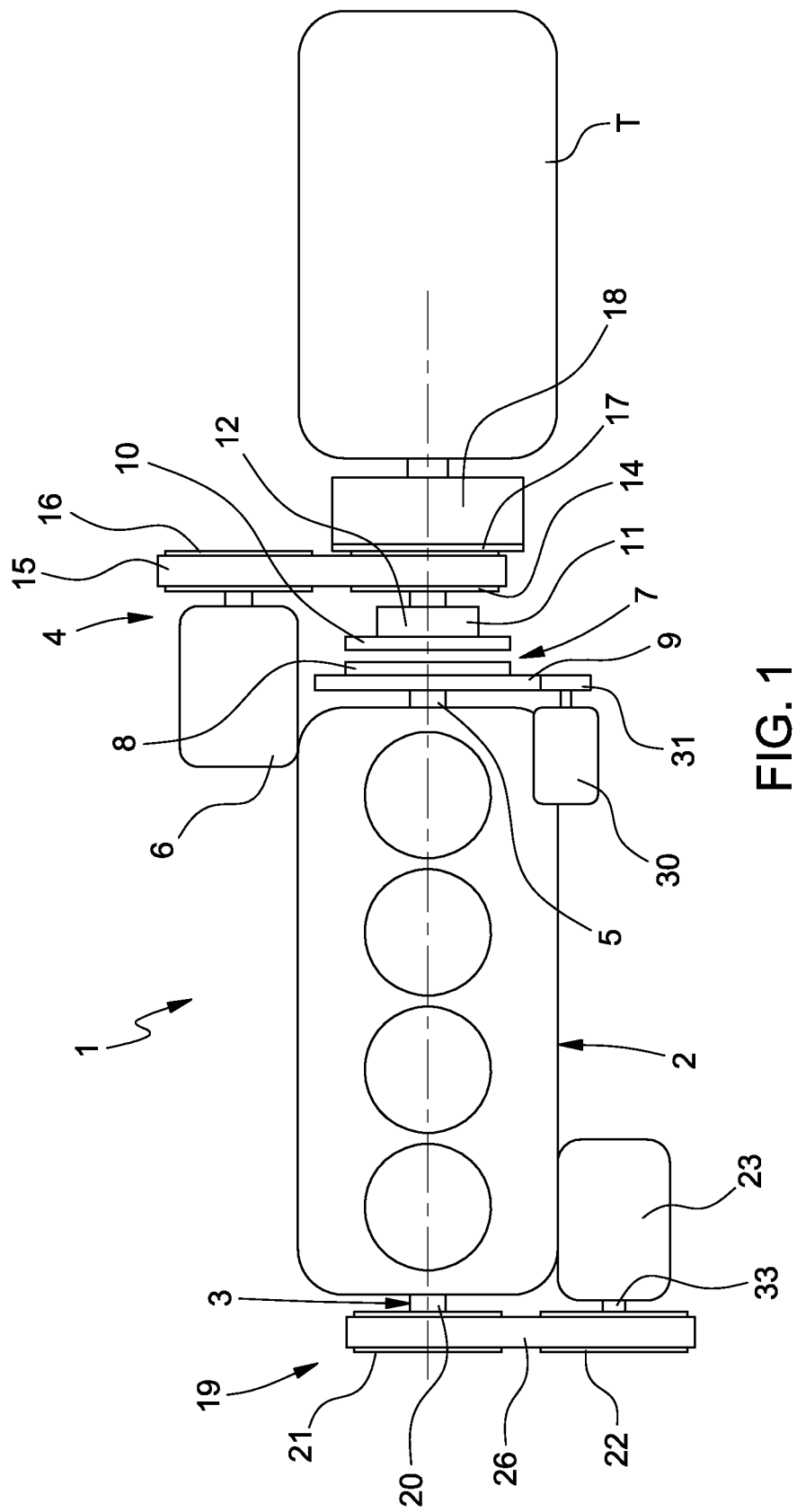
FIG. 1 is a schematic plan view of a hybrid powertrain group comprising an accessory transmission in accordance with the present invention.

With reference to FIG. 1, a powertrain group for a motor vehicle is indicated as a whole by 1.

The powertrain group 1 comprises an internal combustion engine 2 (for brevity "combustion engine 2" hereinafter) with a crankshaft 3 and a hybrid module 4.

The hybrid module 4 is positioned, in use, between the combustion engine 2 and a transmission T of the vehicle and is connected to an end 5 of the crankshaft 3 facing the transmission T.

The hybrid module 4 comprises an electric machine 6 and a decoupling clutch 7 adapted to selectively connect the electric machine 6 to the crankshaft 3 and to the transmission T.

The clutch 7 comprises at least one clutch plate 8, which is axially fixed and rotationally conjoined with a flywheel 9 connected to the end 5 of the crankshaft 3, and a plate 10, which is axially displaceable and rotationally conjoined with an intermediate shaft 11 of the module 4. The clutch 7 finally comprises a hydraulic actuator 12 acting on the plate 10 for the control of the clutch.

The intermediate shaft 11 is connected to a pulley 14 by means of a torsional vibration damper of a known type, not illustrated, which is accommodated within said pulley.

The pulley 14 is connected by a belt 15 to a pulley 16 connected to the electric machine 6.

Fixed to the pulley 14 is a flexible plate 17 or "flex plate", which constitutes an output element of the module 4 adapted to be connected to a torque converter 18, which constitutes an input element of the transmission T.

The powertrain group 1 finally comprises an accessory transmission 19 connected to an end 20 of the crankshaft opposite the end 5.

Figure 2:
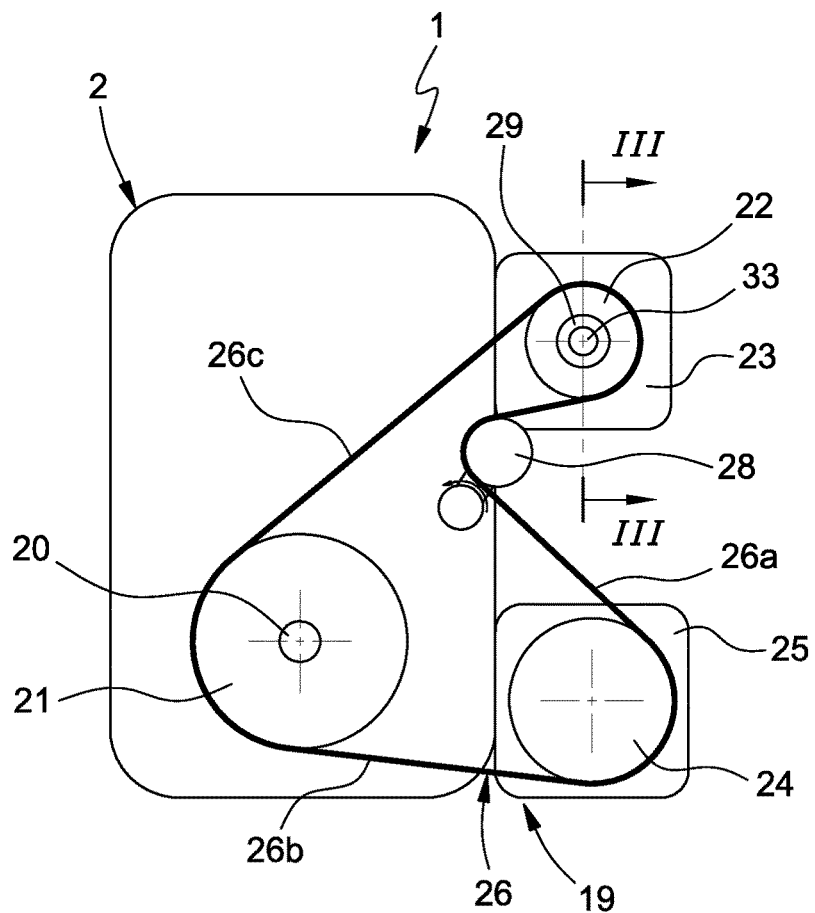
FIG. 2 is a schematic front view of the accessory transmission in accordance with the present invention.
Figure 3:
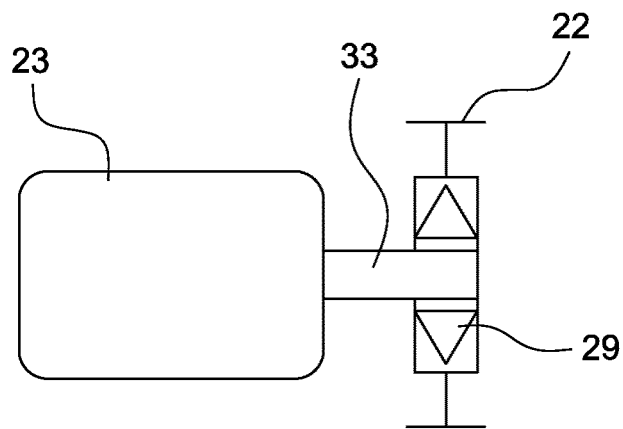
FIG. 3 is a schematic cross-section along the line III-III shown in FIG. 2.

The accessory transmission 19 (FIG. 2) comprises a first pulley 21 fixed to the end 20 of the crankshaft 3, a second pulley 22 linked to a second electric machine 23 and a third pulley 24 for driving a compressor 25 of an air conditioning system. The three pulleys 21, 22 and 24 are connected to one another by a belt 26. A tensioner 28 of a conventional type acts on a span 26a of the belt 26 extending between the second pulley 22 and the third pulley 24. The pulleys 21, 22 and 24 rotate in a same rotation direction R indicated by an arrow in FIG. 3 and coinciding with the rotation direction of the crankshaft 3.

In accordance with the present invention, a one-way clutch 29 (FIG. 3) adapted to enable the transmission of torque from the electric machine 23 to the second pulley 22 but not vice versa is positioned between a shaft 33 of the second electric machine 23 and the second pulley 22. In other words, the one-way clutch 29 allows the electric machine 23 to drive the second pulley 22 in the rotation direction R of the transmission 19, but decouples the second pulley 22 from the electric machine 23 when the second pulley 22 tends to overrun the electric machine 23 in the rotation direction R. The one-way clutch 29 can be constituted by a one-way band clutch or by a ratchet overrunning clutch, with rolling elements or of any other known type.

The powertrain group 1 finally comprises a third electric machine 30 functioning as a starter motor, provided with an output pinion 31 that engages with a toothing of the flywheel. Advantageously, the third electric machine 30 is a brushless motor capable of carrying out a rapid start-up of the combustion engine 2.

The powertrain group 1 functions as follows.

When the clutch 7 is engaged, the intermediate shaft 11 is connected both to the combustion engine 2 as well as to the electric machine 6 and to the transmission T of the vehicle.

In this state, the electric machine 6 can be used as both a generator (for recharging the battery during the combustion-powered drive or as a regenerative brake) as well as a motor for providing additional torque (boosting) in combination with the electric machine 23.

When the clutch 7 is disengaged, the electric machine 6 can be used for the electric drive, the electric braking system and for "coasting" with the combustion engine off.

The start-up of the combustion engine 2 (both a cold start as well as from an electrically-driven state) is carried out by means of the third electric machine 30. During this phase, the clutch 7 is disengaged.

During the start-up phase, in the accessory transmission 19, the belt 26 is guided by the pulley 21 linked to the crankshaft 3 and transmits motion to the pulleys 22, 24. As the pulley 22 tends to overrun the electric machine 23, the one-way clutch 29 decouples the latter from the pulley 22.

Figure 4:
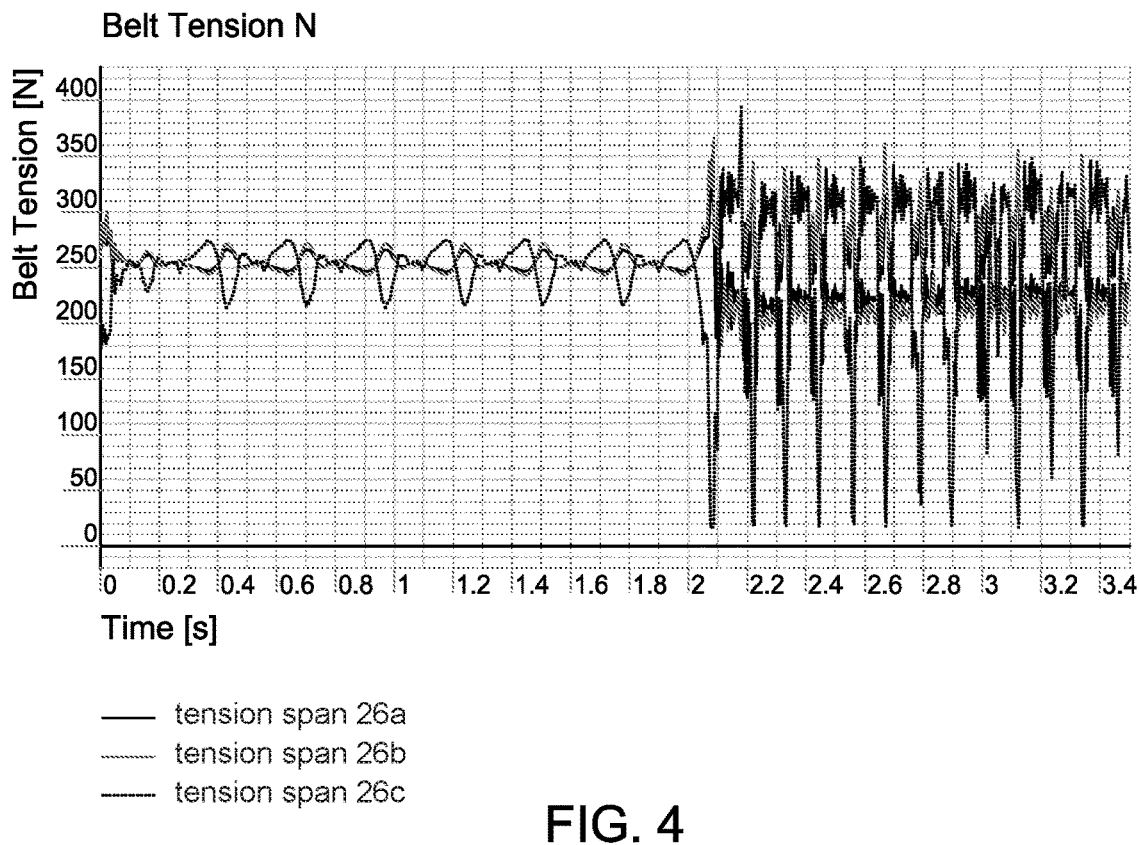
FIG. 4 is a graph that shows the variations in the tension of the belt in an accessory transmission of a conventional type.
Figure 5:
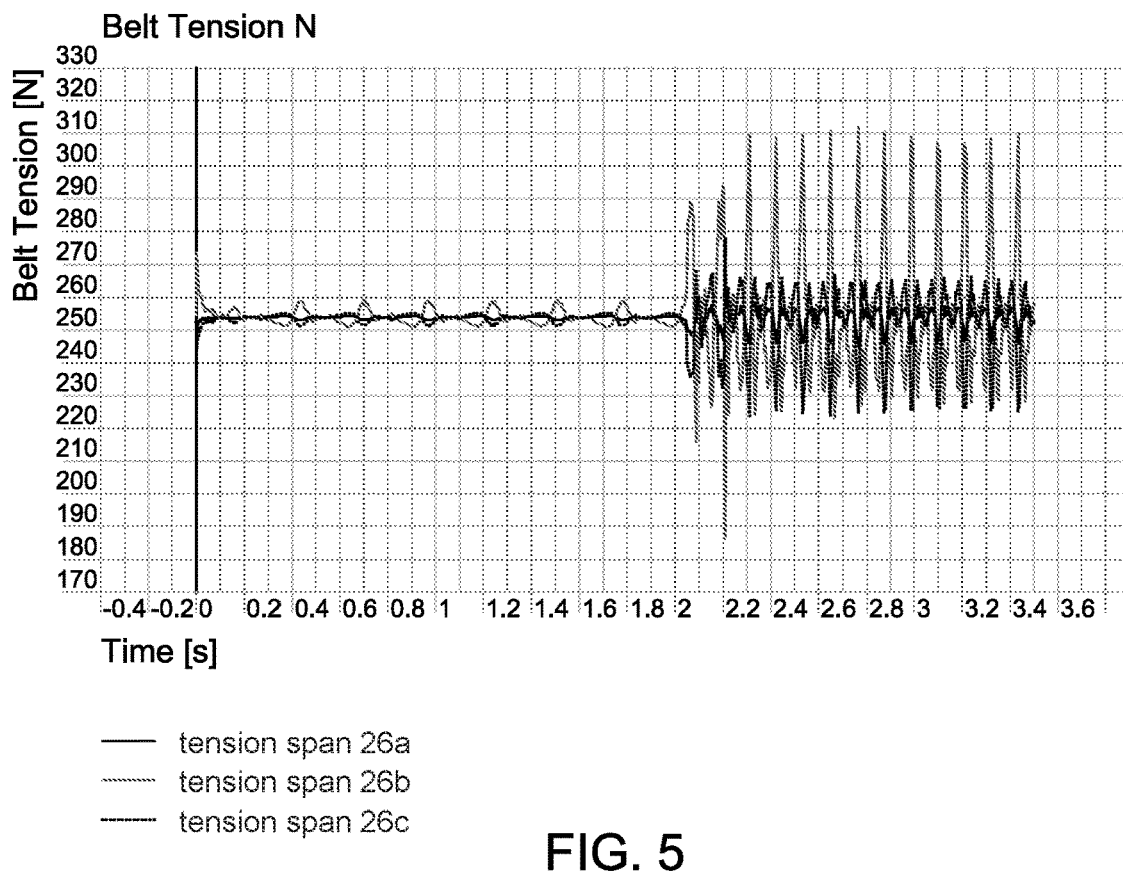
FIG. 5 is a graph that shows the variations in the tension of the belt in an accessory transmission in accordance with the present invention.

For a better understanding of the effect of the one-way clutch 29 in accordance with the present invention, FIGS. 4 and 5 illustrate the progression of the tension of the belt 26 both in a conventional accessory transmission without the one-way clutch 29 (FIG. 4) and in an accessory transmission provided with the one-way clutch 29 in accordance with the invention. In particular, the tensions are measured in the three sections 26a, 26b and 26c arranged between the pulleys 22 and 24, between the pulleys 24 and 21 and between the pulleys 22 and 21, respectively, and displayed in the graphs as a function of time. The progression of the tensions with the engine off (driven by the electric machine 6) is observable in the time interval comprised between 0 and 2; the course of the tensions in the start-up phase of the combustion engine 2 by means of the electric motor 30 can be observed as of 2s.

As is evident in FIG. 4, against an average value of the tension of the belt of around 250 N when the engine is driven, oscillations in tension of a significant amplitude occur in the section 26c at start-up, in the order of approximately 300 N, with minimum peak values in the order of 20 N. Values this low, which are essentially due to the inertia of the electric machine 23 in the presence of the torsional vibrations induced by combustion at start-up, can cause slipping and noise.

FIG. 5 illustrates the progression of the same tensions in the presence of the one-way clutch 29 in accordance with the present invention, by means of which the electric machine 23 is decoupled from the accessory transmission 19 at the start-up of the combustion engine 2, state in which it tends to be driven by the belt 26. The effective improvement of the dynamic behaviour of the transmission is evident, with a reduction in the amplitude of the oscillations in tension in the section 26c of the belt 26 to approximately 40 N, and with minimum peak values in the order of 225 N (still compared with an average value of the tension of the belt in the order of approximately 250 N when the combustion engine is driven).

Finally, it is clear that the transmission 19 and the powertrain group 1 described can be complemented by modifications and variations which do not go beyond the protective scope defined by the claims.

The invention claimed is:

1. A powertrain group comprising:
    an internal combustion engine provided with a crankshaft having a first end facing a transmission of the vehicle and a second end;
    a hybrid module connected to the first end of the crankshaft, the hybrid module comprising a first electric machine and a clutch for selectively connecting the first electric machine to the crankshaft and to the transmission of the vehicle;
    at least a second electric machine provided with a shaft;
    a third electric machine which functions as a starter motor for the engine; and
    an accessory transmission comprising:
        a first pulley adapted to be connected to a crankshaft of the engine;
        at least a second pulley adapted to be connected to a shaft of an electric machine through a one-way clutch;
        a belt connecting the first and the at least one second pulley to one another in order to rotate in one and the same rotation direction;
    wherein the first pulley of the accessory transmission is connected to the second end of the driveshaft and the second pulley of the accessory transmission is selectively connectable to the shaft of the second electric machine by means of a one-way clutch, the one-way clutch being adapted to decouple the second pulley from the shaft of the second electric machine when the crankshaft is driven by the third electric machine.

2. The powertrain group according to claim 1, further comprising at least a third pulley connected to an accessory of the engine, the belt connecting the first, second and the third pulleys to one another in order to rotate in said rotation direction.

3. The powertrain group according to claim 2, further comprising a tensioner acting on a span of the belt extending between the second pulley and the third pulley.

4. A control method of a powertrain group according to claim 1, wherein the first electric machine is reversible and is operable as a motor or as a generator depending on the operating conditions, and in that the second electric machine is used as a motor.

* * * * *